(12) United States Patent
McDonald et al.

(10) Patent No.: US 10,898,305 B2
(45) Date of Patent: Jan. 26, 2021

(54) CERVICAL MATRIX

(71) Applicant: DENTSPLY International Inc., York, PA (US)

(72) Inventors: Simon P. McDonald, Katikati (NZ); Alejandro Aubone, Auckland (NZ)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 14/901,653

(22) PCT Filed: Jul. 3, 2014

(86) PCT No.: PCT/US2014/045478
§ 371 (c)(1),
(2) Date: Dec. 28, 2015

(87) PCT Pub. No.: WO2015/003165
PCT Pub. Date: Jan. 8, 2015

(65) Prior Publication Data
US 2016/0143706 A1 May 26, 2016

(30) Foreign Application Priority Data
Jul. 3, 2013 (NZ) .................................... 612776

(51) Int. Cl.
*A61C 13/15* (2006.01)
*A61C 5/85* (2017.01)
(52) U.S. Cl.
CPC .............. *A61C 19/003* (2013.01); *A61C 5/85* (2017.02)

(58) Field of Classification Search
CPC ......... A61C 5/12; A61C 5/122; A61C 19/003; A61C 5/85; A61C 5/125; A61C 5/127
See application file for complete search history.

(56) References Cited

U.S. PATENT DOCUMENTS

| | | | | |
|---|---|---|---|---|
| 4,449,928 A | * | 5/1984 | von Weissenfluh | A61C 5/50 433/229 |
| 4,718,849 A | * | 1/1988 | von Weissenfluh | A61C 5/125 433/229 |

(Continued)

FOREIGN PATENT DOCUMENTS

| | | | | |
|---|---|---|---|---|
| DE | 202012005730 U1 | * | 7/2012 | ............. A61C 5/125 |
| DE | 202012005730 U1 | * | 7/2012 | ............... A61C 5/85 |

(Continued)

OTHER PUBLICATIONS

T. Wentink et al, Innfrared Transmission and Emission of Teflon, Mar. 1960.*

(Continued)

*Primary Examiner* — Sean M Michalski
*Assistant Examiner* — Shannel N Wright
(74) *Attorney, Agent, or Firm* — Dentsply Sirona Inc.

(57) ABSTRACT

A universal cervical matrix for dental use comprising a lamina having at least an outer layer and an inner layer, the inner layer comprising a non-stick surface to prevent adhering to a chemically-cured dental restoration material, and the outer layer comprising an energy-absorbing material. The energy-absorbing material absorbs energy output from a dental curing light and provides heat to the dental restoration material, thereby increasing curing rate.

6 Claims, 2 Drawing Sheets

(56) References Cited

U.S. PATENT DOCUMENTS

| | | | | |
|---|---|---|---|---|
| 5,176,517 A * | 1/1993 | Truax | ............... | A61C 7/00 |
| | | | | 433/180 |
| 5,380,198 A * | 1/1995 | Suhonen | ............... | A61C 5/85 |
| | | | | 433/39 |
| 5,975,906 A * | 11/1999 | Knutson | ............... | A61C 5/85 |
| | | | | 128/DIG. 14 |
| 6,220,858 B1 * | 4/2001 | McKenna | ............... | A61C 5/85 |
| | | | | 433/139 |
| 6,749,427 B1 * | 6/2004 | Bretscher | ............... | A61B 1/247 |
| | | | | 433/30 |
| 2003/0186186 A1 * | 10/2003 | Hahn | ............... | A61C 5/85 |
| | | | | 433/39 |
| 2009/0142725 A1 * | 6/2009 | Bryant | ............... | A61C 5/85 |
| | | | | 433/39 |
| 2011/0070555 A1 * | 3/2011 | Anderson | ............... | A61C 5/125 |
| | | | | 433/39 |

FOREIGN PATENT DOCUMENTS

| | | | | |
|---|---|---|---|---|
| WO | 2012064750 A1 | 5/2012 | | |
| WO | WO 2012064750 A1 * | 5/2012 | ............... | A61C 5/85 |

OTHER PUBLICATIONS

"G.V. Blacks Classification of Caries." Dentodontics, Dec. 13, 2015, dentodontics.com/2015/02/26/g-v-blacks-classification-of-carious-lesions/. (Year: 2015).*

European Patent Office, International Search Report and Written Opinion, PCT/US2014/045478, dated Oct. 24, 2014, Netherlands and Germany.

* cited by examiner

CERVICAL MATRIX

CROSS-REFERENCE TO RELATED APPLICATIONS

This application claims priority to New Zealand Application No. 612776, filed Jul. 3, 2013, the entire contents of which is hereby incorporated by reference.

FIELD OF THE INVENTION

The present invention relates to an apparatus for use with restorative dentistry and in particular to restoration of Black's Class V caries lesions.

BACKGROUND OF THE INVENTION

Dental caries or tooth decay is an irreversible infection and is one of the most common diseases in the world. G. V. Black first classified caries lesions into five categories. Later, a sixth category was also included. These classifications are made based on the location, rate of progression, aetiology and affected hard tissue.

Class V caries affect the gingival third of the buccal or lingual surfaces of teeth. Traditionally, to restore the tooth, the dentist first removes the caries lesion. The dentist then fills the cavity with a dental restorative material such as composite resin or glass ionomer cement (GIC). The cervical matrix is pressed against the tooth to compress and shape the restorative material. The restorative material is chemically-cured or light-cured through the matrix. The exterior surface of the restorative material needs to be fully cured before the matrix is removed. If the matrix is removed early, the restorative material can be distorted and the restoration has to be repeated. Light-cured resins are typically cured with dental light cure units that emit ultraviolet or visible light. Visible light emissions are usually in the violet to blue end of the visible light spectrum. Light-cured resins are fully cured relatively quickly. Chemically-cured resins, on the other hand, may take several minutes to fully cure.

Universal transparent plastic cervical matrices are known and used in modern dentistry. Prior art (expired U.S. Pat. No. 4,449,928, herein incorporated by reference) describes a cervical matrix which consists of a transparent, soft elastic, concave lamina with a rigid stem at the rear that is grasped by forceps or tweezers. Colorless, transparent, and blue-tinted matrices are known in the prior art to readily allow the transmission of blue curing light through the matrix.

While prior art matrices enable transmission of light for light-cured resins, those devices do not improve the curing time of chemically-cured restorations. The cervical matrix of the present invention aims to overcome the disadvantages of prior art restorative matrices.

SUMMARY OF THE INVENTION

It is therefore an object of the present invention to provide a universal cervical matrix that may provide an improved curing time for chemically-cured dental restoration material.

The present invention provides a universal cervical matrix for use in restoration of Class V caries lesions with a chemically-cured dental restoration material, comprising a concave elastic lamina, the lamina comprising at least 2 layers, wherein an outer layer is adapted to absorb ultraviolet and visible light, and wherein an inner layer comprises a material which does not adhere to the dental restoration material.

DETAILED DESCRIPTION OF THE PRESENT INVENTION

Figure 1:
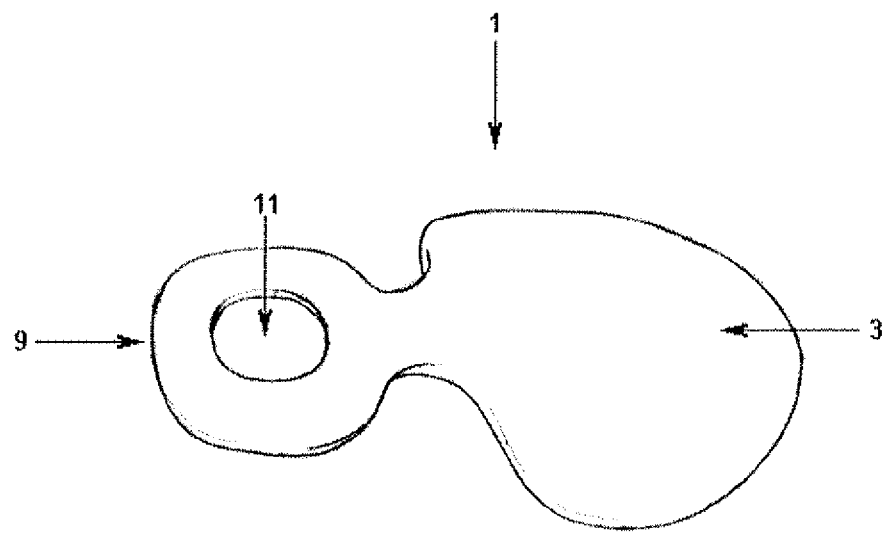
FIG. 1 is a perspective view of the cervical matrix.
Figure 2:
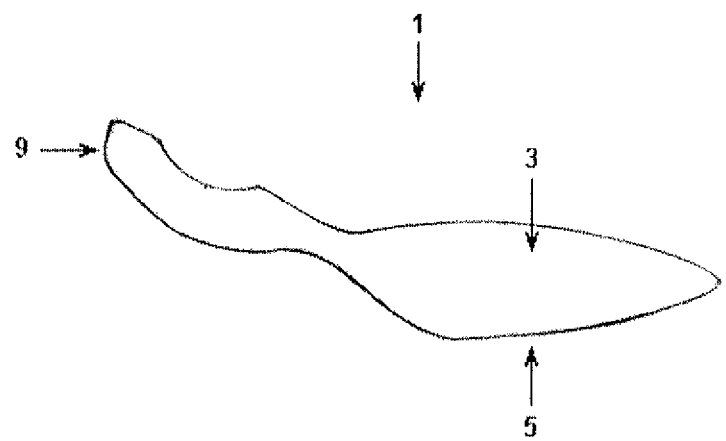
FIG. 2 is a side view of the cervical matrix.
Figure 3:
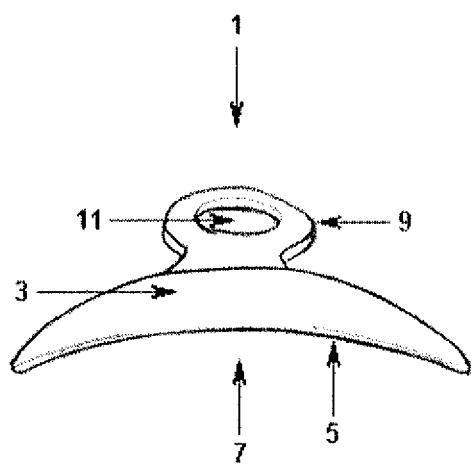
FIG. 3 is a front view of the cervical matrix.

FIG. 1-3 illustrate an embodiment of the present invention. The cervical matrix 1 comprises an elastic lamina. The cervical matrix 1 defines a body portion presenting a convex side and a concave side. In this embodiment, the lamina is made of an outer layer 3 and an inner layer 5. The outer layer 3 comprises an elastic energy-absorbing material and provides the main structure of the matrix 1. The inner layer 5 of the matrix 1 comprises a coating of non-stick material applied to the bottom surface of outer layer 3. The non-stick material may be any material which prevents the matrix from adhering to a dental restoration material. The nonstick material may be a non-stick polymer, such as a fluoropolymer. Acceptable fluoropolymers include, but are not limited to: polytetrafluoroethylene, perfluoroalkoxy, and fluorinated ethylene propylene. The matrix 1 has a concave shape 7. The matrix has a handle 9 that provides a site for gripping with tweezers. The handle 9 may be made from a different material than the outer layer 3. The handle 9 has a hole 11 which provides further options for gripping with tweezers.

In practice, the dentist first prepares a Class V cavity on the tooth surface so that it is ready to receive a chemically-cured restorative material. The dentist then fills the cavity with the restorative material. The improved cervical matrix is placed over the restoration site with the inner layer against the tooth and held in place against the tooth using tweezers. The non-stick material of the inner layer prevents the restoration material from adhering to the matrix. A dental curing light is held close to the matrix and activated. As the curing light emits energy, the outer layer of the matrix absorbs the energy and heats up, transferring some heat energy to the restoration site. The increased heat energy in the restoration site increases the rate of reaction of the chemical cure. Typically, the cure time is reduced from two minutes to twenty seconds. Once the exterior of the restoration is sufficiently cured so that it will not be easily deformed, the matrix can be removed from the tooth. When the interior of the restoration material is cured, the dentist is able to finish the restoration.

In another embodiment, not illustrated, the lamina is made of three layers: a core layer, an outer layer, and an inner layer. In this embodiment, the core layer provides the main structure of the matrix and comprises a material which conducts heat, such as metal. The outer layer comprises a coating of energy-absorbing material. The inner layer comprises a coating of non-stick material. When the outer layer absorbs energy from a dental curing light and heats up, the core layer conducts heat from the outer layer toward a restoration site. The heat conducted toward the restoration site increases the rate of curing as discussed above.

Other embodiments, not illustrated, may not include a hole within the handle. Still other embodiments, not illustrated, may include variations on the position of the handle or may not include handle at all. In addition, the size and shape of the matrix may vary in other embodiments in order to accommodate teeth of different sizes or shapes.

The invention claimed is:
1. An improved universal cervical matrix for dental use comprising:

a concave lamina defining a body portion presenting a convex side and a concave side, said concave lamina having at least two layers wherein an outer layer comprises an elastic material capable of absorbing near-ultraviolet to blue light; and wherein an inner layer comprises a coating of non-stick material for non-adhesively contacting a quantity of chemically-cured restorative material and wherein said inner layers contacts a tooth to be treated, a core layer between the outer layer and inner layer, wherein the core layer comprises a material which conducts heat from said outer layer toward a restoration site to increase curing rate, wherein the matrix has a handle located along a same plane as the concave lamina defining a body portion, the handle having a void capable of being grasped by tweezers, wherein the material of the core layer is metal;

wherein the core layer is constructed to provide a main structure of the matrix;

wherein upon absorbing the light, the outer layer absorbs energy and heats up thereby transferring heat energy to the chemically-cured restorative material; and wherein a cure time of the chemically-cured restorative material is reduced to twenty seconds.

2. The matrix in claim 1, wherein the non-stick material is a non-stick polymer.

3. The matrix in claim 2, wherein the non-stick material is a fluoropolymer.

4. The matrix in claim 3, wherein the non-stick material is one of polytetrafluoroethylene, perfluoroalkoxy, or fluorinated ethylene propylene.

5. The matrix in claim 1, wherein the handle is made from a different material than the material of the outer layer.

6. The matrix according to claim 1, wherein the handle includes only one void.

* * * * *